United States Patent [19]

Evans

[11] 4,151,051

[45] Apr. 24, 1979

[54] ELECTRODEPOSITION MINING OF MATERIALS FROM NATURAL WATER BODIES

[76] Inventor: Robert F. Evans, 631 Honeywood La., La Habra, Calif. 90631

[21] Appl. No.: 901,499

[22] Filed: May 1, 1978

[51] Int. Cl.² ............................ C25B 1/00; C25B 9/04
[52] U.S. Cl. ................................. 204/86; 204/105 R; 204/DIG. 3; 204/DIG. 5; 204/193; 204/194
[58] Field of Search ................... 204/96, 98, 128, 232, 204/105 R, 257, 149, 271, 86, DIG. 3, DIG. 5, 194, 193

[56] References Cited

U.S. PATENT DOCUMENTS

| | | | |
|---|---|---|---|
| 642,023 | 1/1900 | Vis | 204/98 |
| 2,179,537 | 11/1939 | Zoppa | 204/232 |
| 2,325,660 | 8/1943 | Chamberlain | 204/12 |
| 2,755,241 | 7/1956 | Bagley et al. | 204/105 |
| 3,082,160 | 3/1963 | Sabins | 204/96 |
| 3,718,552 | 2/1973 | Mortell | 204/105 R |
| 3,748,248 | 7/1973 | Wanzenberg et al. | 204/105 R |
| 3,752,745 | 8/1973 | Kane et al. | 204/105 M |
| 3,809,624 | 5/1974 | Kane et al. | 204/105 M |
| 3,810,827 | 5/1974 | Kane et al. | 204/105 M |
| 3,819,231 | 6/1974 | Fehlner | 299/4 |
| 3,836,443 | 9/1974 | MacGregor | 204/105 M |
| 3,894,299 | 7/1975 | Drinkard et al. | 204/286 |
| 3,901,755 | 8/1975 | Kane et al. | 204/105 M |

Primary Examiner—R. L. Andrews
Attorney, Agent, or Firm—John R. Ley

[57] ABSTRACT

A deposition unit having a cathode surface is submerged in a natural body of moving water containing various materials including metallic materials carried by the flow of movement of the water body. The flow of water encompasses the deposition unit and contacts the cathode surface. An electric current at the cathode surface causes electrodeposition of certain materials contained within the flow of moving water. The electrical energy for electrodeposition is derived from a naturally occurring and proximate energy source at the body of water. Energy from tidal flow, from water movement beneath the surface, from wave motion at the upper surface, or from a temperature difference between the upper and lower levels of the water body, operates an electrical generator which supplies the electrodeposition energy. The flow of water relative to the deposition unit cooperatively interacts with magnetic flux emanating from another embodiment of the deposition unit to establish the electrodeposition energy. Other sources of proximate naturally occurring energy for effecting electrodeposition are wind energy and solar energy.

19 Claims, 9 Drawing Figures

ELECTRODEPOSITION MINING OF MATERIALS FROM NATURAL WATER BODIES

BACKGROUND OF THE INVENTION

1. Field of the Invention

This invention relates to the mining of materials, preferably elemental metallic materials, compounds of metals or both or the like, from a natural body of water containing such materials. More particularly, the present invention relates to electrodeposition of such materials from natural bodies of moving water by use of energy substantially derived from naturally occurring proximate energy sources.

2. Introductory Discussion

Land surface mining operations and techniques supply the vast majority of the various metallic ores and elemental chemical substances. However, current circumstances have led to some major problems associated with land mining operations. Ecological problems such as air pollution from smelter operations, water or stream pollution from mine tailings and land surface disfigurations from strip mining and the like have become significant factors in inhibiting or restricting use of some surface mining techniques. The increasing costs of conventional sources of energy necessary to operate typical land surface mines and extractive metallurgy processes have resulted in decreased profitability and termination of operation of some mining operations. Lastly, the supply of some metallic materials is not unlimited, and eventually, the land surface supplies of these materials will approach serious levels of depletion.

An estimated 350 million cubic miles of ocean water covers much of the earth's surface. The oceans have been termed the world's largest ore bodies. It is recognized that many materials, including a wide variety of elemental metallic materials, are known to exist in huge quantities, but in very low concentrations, in the oceans. Economic recovery of these metals has been questionable because of the very low concentration and because of the relatively high costs of extracting these metals. Evidence of the concentration and existence of many valuable minerals and other metallic materials in the ocean water is seen from the existence of well-known nodules typically formed on the ocean floor. The value of actively devising mining systems for recovering commercial quantities of mineral rich material from these nodules has been recognized, and efforts are currently underway to perfect such recovery techniques.

The exact phenomena of nature by which the concentrations of minerals and materials from the ocean water occurs is not exactly known, but observations have shown that the process is extremely slow. The use of small electrical currents can accelerate the precipitation and collection of these materials, and in effect, grow a mineral-rich deposit possessing worthwhile value. However, the rate of material deposited is not great enough to economically justify a commercial mining operation in which sea water is processed with commercially purchased energy. There is at present very little use of the low level energy resources which exist so abundantly.

It is from these considerations and others that the present invention has evolved. It is generally proposed by the present invention that deposits of mineral-rich material can be obtained from natural bodies of water, such as the ocean water, in an economically rewarding and feasible manner.

3. Brief Description of Prior Art

Although the present invention exhibits significantly new and improved concepts, the prior art comprises certain knowledge which is of relevance or of interest with respect to the present invention. For example, it is known in the art to utilize electrodeposition or electrowinning techniques in mining various ores contained within an electrolytic slurry. Electrodeposition techiques have also been utilized to recover minerals and metals in situ from ore bodies beneath the earth's surface, and to recover these materials from the ocean floor or from the naturally occurring nodules found on the ocean floor. Certain features of the present invention relate to the induction of an electromagnetic force as a result of water moving through a magnetic field. This concept has been recognized in science. Limitations and considerations other than those briefly discussed here may be known in the prior art. However, the present invention represents significant advancements over the prior art.

SUMMARY OF THE INVENTION

It is the general objective of this invention to provide a new and improved method of mining or obtaining minerals or materials from a natural body of water, such as ocean water or the like. It is also an objective of the present invention to use naturally occurring and proximate energy sources in obtaining or mining these materials. A further objective is to teach an economically feasible method of mining materials and other materials which exist in very low concentrations in naturally occurring bodies of water. Another objective is to obtain significant quantities of various materials and minerals by an ecologically unobjectionable mining process. Still a further object is to obtain significant amounts of minerals and other materials without expenditure of extremely large quantities of commercially supplied energy.

In accordance with these and other objectives, the present invention generally includes the concept of suspending a deposition unit in a natural body of moving water containing amounts of the various materials and minerals to be mined. The deposition unit includes a cathode which is encompassed within the flow of moving water. A flow of electrical current is established at the cathode by use of energy derived from naturally occurring and proximate energy sources. The flow of electrical current creates an electrodeposition of various materials and minerals from the water at the cathode. After the deposition unit has been suspended in the body of moving water for a sufficient period, the growth or deposit of minerals or materials on the cathode becomes significant. Thereafter, the deposition unit can be recovered from the water body and the deposit of material removed or otherwise used.

Sources of natural energy used in creating the electrical current for electrodeposition include solar photovoltaic energy, energy derived from wave motion, energy derived from the wind, energy derived from tides or other moving water, and energy derived from thermal gradients in the water. An electrical generator converts physical energy into the electrical energy. A permanent magnet supplying magnetic flux cooperates with the moving water, and a resulting electromotive force also establishes the electrical currents.

The features which define the present invention are recited in the appended claims. The various features, objectives and advantages of the present invention can better be understood from the following description of a presently preferred embodiment of the invention taken in conjunction with a drawing consisting of a number of figures.

DESCRIPTION OF PREFERRED EMBODIMENTS

Figure 1:
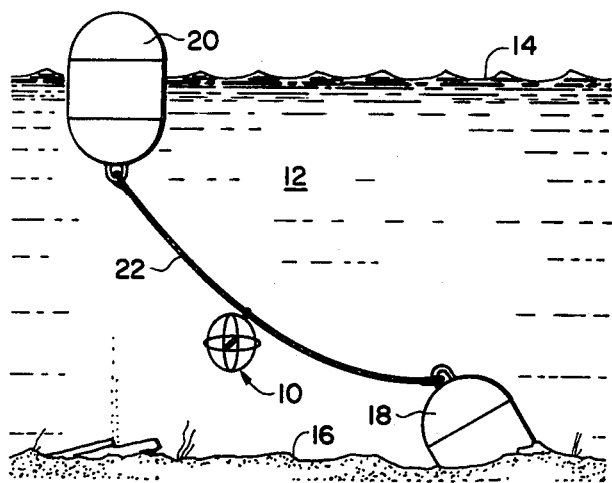
FIG. 1 is a general schematic view illustrating the method and apparatus according to the present invention, in which a deposition unit is suspended in and encompassed by moving water from a natural body of water containing various materials and minerals including ionic elemental metallic materials.

The process according to the present invention of mining various naturally occurring materials and minerals, including elemental or ionic metallic materials and compounds of metals or the like, carried by and contained within a natural body of moving water, such as ocean water or the like, is illustrated by use of the apparatus generally illustrated in FIG. 1. A deposition unit 10 is submerged in or suspended within a body of water 12 below the upper surface 14 of the water body. At the floor or seabed 16 of the body of water, an anchor 18 is positioned to resist movement. A buoy 20 or other suitable means floating at the surface 14 of the water body 12 is also provided. A tether cord 22 or connection means is attached at its ends and extends substantially directly between the anchor 18 and buoy 20. The deposition unit 10 is firmly secured to the tether cord 22 at a position substantially intermediate the upper surface 14 and floor bed 16. Alternatively, the deposition unit 10 can be positioned immediately below the buoy 20. Positioned thusly, the deposition unit 10 is encompassed within and substantially freely exposed to the flow or movement of water naturally occurring within the water body 12. The arrangement of the anchor 18, buoy 20 and tether cord 22 substantially restricts the movement of the deposition unit 10 so that natural movement of the water body 12 establishes a flow of water relative to the deposition unit 10. Although only a single deposition unit 10 is illustrated, any number of deposition units may be secured to the tether cord 22 or positioned by suitable means within the water body.

The body of water 12 is any naturally occuring body of water which normally contains and carries various minerals, materials and metallic elements in the various naturally occurring forms. It is contemplated that the ocean will be the most advantageous body of water for use of the invention. In any event, the natural body of water will be an electrolytic fluid. An electrolytic fluid contains various positively and negatively charged ions which respectively accept and give up electrons under the application of an electromotive force or voltage between differently or oppositely charged areas or electrodes within the solution. The positively charged ions within the electrolytic solution are drawn to the negatively charged electrode or cathode area, and there accept electrons sufficient to reduce the ion to a neutrally charged form. Typically, the positively charged ions will be metal ions, and the metal ions accept sufficient electrons at the cathode to reduce the ion to its metallic form. The metallic form of the material is plated out or deposited on the cathode. On the other hand, the negatively charged ions are drawn to the positively charged electrode or anode area and there, give up sufficient electrons to transform the ion into its normal molecular state. This series of events generally defines the known process of electrodeposition, and describes a physical result in which positively charged ions within the electrolyte or water body are deposited or plated out on the cathode or deposition surface. The flow of electrons defines an electrical current.

Naturally occuring water bodies such as sea water contain numerous dissolved or suspended metallic ionic particles, compounds and materials as well as some charged colloidal particles. In addition to the plating out of the metallic ionic materials at the negative electrode, some of the insoluble colloidal particles will also be adsorbed and entrapped by the formation of the deposit at the negative electrode.

The deposition unit 10 employs means for electrodepositing metallic materials and minerals and other materials. Preferably, the deposition unit 10 is utilized in conjunction with a proximate source of naturally occurring energy to obtain sufficient electrical energy for effecting electrodeposition.

Figure 2:
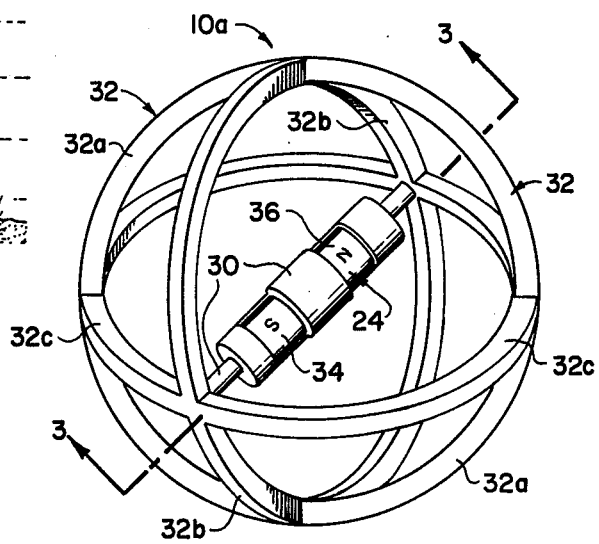
FIG. 2 is a perspective view of one embodiment of a deposition unit in accordance with the present invention wherein a permanent magnet means is utilized, as in magnetohydrodynamic energy conversion.
Figure 3:
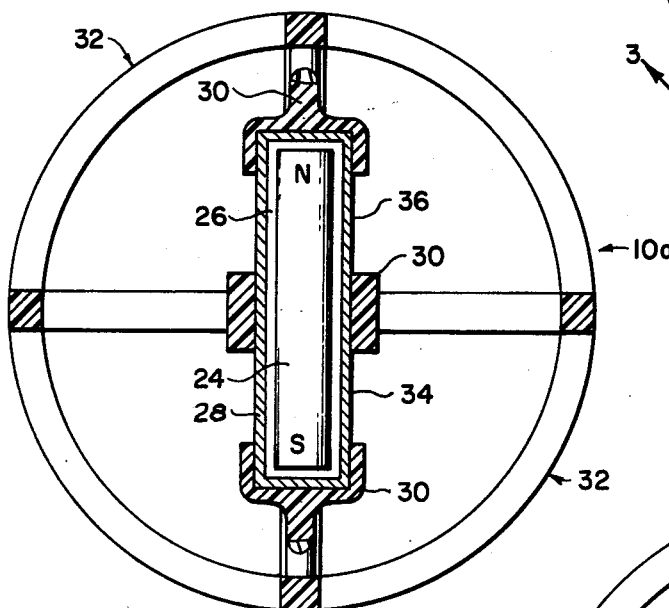
FIG. 3 is a planar section view taken substantially in the plane of lines 3—3 of FIG. 2.

A deposition unit 10a illustrated in FIGS. 2 and 3 utilizes the flow of moving water encompassing the unit to derive electrical energy for electrodeposition. The unit 10a includes a permanent magnet 24 around which a selenium coating 26 has been placed. The permanent magnet is located within the interior of an aluminum enclosure 28 with the selenium coating contacting the aluminum. The selenium coating interacts with the aluminum to create the well-known electrical current rectification action. The selenium is one of many known rectifying materials which could be employed, others including silicon, germaniun and copper-copper oxide, for example.

The aluminum enclosure 28 is firmly secured within a center bar 30 of a spacing cage 32. The spacing cage is defined by three rings 32a, 32b and 32c lying in the three mutually perpendicular planes. Rings 32b and 32c are joined together at the ends of the center bar 30. Preferably, the spacing cage 32 is made of plastic material and the aluminum enclosure 28 is molded in the plastic of the center bar 30. However, surface portions 34 and 36 of the aluminum enclosure 28 adjacent the magnetic poles or polar ends of the permanent magnet 24 are freely exposed to the flow of water encompassing the deposition unit. The exposed surface portions form the negatively charged electrodes of the deposition unit. The aluminum enclosure is maintained predominantly as a cathode by reason of the rectifying action of the selenium-aluminum interaction, explained subsequently. The spacing cage 32 spaces each deposition from adjoining units, when a plurality of units are employed, and thereby prevents significant adverse interaction of the magnetic flux from other deposition units on the rectifying elements.

It is known that the flow of water through electromagnetic flux will generate an electromotive force or voltage. A discussion of this principle appears in *GEOMAGNETISM* by Chapman et al., Oxford University Press, 1940, pp. 445-448. This principle and magnetohydrodynamic energy conversion principles are applicable to the deposition unit 10a shown in FIGS. 2 and 3. The permanent magnet 24 emanates magnetic flux from its magnetic poles or polar ends. The magnetic flux links the polar ends externally of the permanent magnet. The relatively open structure of the spacing cage 32 allows the moving water to encompass and freely contact the exposed surfaces 34 and 36. The flow of water relative to the deposition unit 10a and through the magnetic flux emanating from the permanent magnet creates an electromotive force or voltage. Since the magnetic flux is of the highest density near the areas surrounding the polar ends of the magnet, surfaces 34 and 36 are the areas of greatest electromotive force. The result is a potential differential between the surfaces 34 and 36 and the regions of more positive electromotive force in the surrounding body of water. The voltage differential attracts the various charged ions in the moving water and causes the metallic ions carried by the water to plate out on the surfaces 34 and 36.

The degree of electrodeposition is enhanced by rectifying the direction of electron or current flow at the surfaces 34 and 36. Rectification assures that one or both of the other surfaces 34 or 36 is cathodic at all times. The polarity of the potential differential created between the surfaces 34 and 36 and the surrounding more positively charged regions depends, among other things, on the direction of magnetic flux flow relative to the direction of water flow. As can be appreciated, the deposition unit 10a moves freely on the tether cord and orients itself randomly relative to the moving water flowing past it. Also, the direction of the moving water may periodically reverse or change, as with a tidal current. To rectify the electron flow under these circumstances, the embodiment of the deposition unit shown in FIG. 3 uses the selenium coating 26 and the aluminum enclosure 28. The selenium coating interacts with the aluminum enclosure and forms a rectifier to allow electrons to flow freely from the aluminum enclosure into the water body but to block electron flow in the opposite direction. The rectification elements become, in effect, a high electrical resistance to electron flow in the direction which would otherwise make surfaces 34 and 36 anodic, thereby assuring predominantly cathodic reaction at the surfaces 34 and 36.

Electrodeposition also occurs if the rectifying elements associated with the permanent magnet are not employed. In such an arrangement, both polar ends of the permanent magnet are freely exposed to contact the moving water body. Both polar ends of the magnet, or exposed surface elements enclosing the magnet ends, act as the cathode surfaces to receive the plated out metallic materials and other minerals from the water body at different times, depending upon the orientation of the permanent magnet relative to the direction of flow of water over it.

Figure 4:
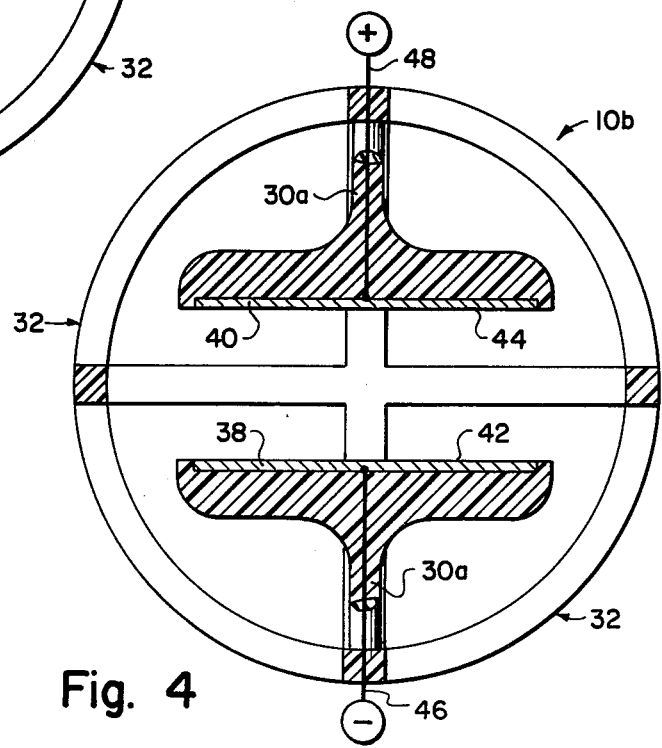
FIG. 4 is a vertical section view of another embodiment of an exemplary deposition unit related to that shown in FIGS. 2 and 3.

FIG. 4 illustrates one example of an alternative embodiment of a deposition unit which also establishes a rectified current flow through the moving water body. In the deposition unit 10b, a modified, two-section center bar 30a positions a pair of electrode plates 38 and 40 in spaced-apart and confronting relation. The electrode plates 38 and 40 are appropriately molded to and retained by the modified center bar 30a. Outer surfaces 42 and 44 of the electrode plates 38 and 40 respectively are freely exposed to the flow of moving water encompassing the deposition unit 10b. Conductors 44 and 46 are electrically connected to the electrode plates 38 and 40 respectively. A direct current and voltage source is applied between conductors 38 and 40 by means of the electrical conductors 46 and 48. Conductor 48 carries the positively referenced source of voltage, and conductor 46 carries the negatively referenced source of voltage. Therefore, the outer conducting surface 42 of the electrode plate 38 becomes the cathode surface and outer conducting surface 44 of the electrode plate 40 becomes the anode surface of the deposition unit. In this manner, a rectified flow of electrical current from the anode surface 44 to the cathode surface 42 is established. The electrical conductors 46 and 48 are appropriately retained by or molded within the spacing cage and extend therefrom to the source of voltage.

Electrodeposition occurs upon the application of the direct current and voltage to the electrode plates 38 and 40 and immersion of the unit in the water body. Materials including metallic ions are deposited or plated out on the cathode surface 42 of the electrode plate 38. To avoid dissolving the anode surface into the electrolyte solution during electrodeposition, the plate 40 should be formed of a material such as carbon.

Energy for supplying potential and direct current to the anode and cathode surfaces of the deposition unit 10b is derived from a natural proximate source of energy. Proximate natural sources of energy include those derived from tidal movements or the flow of water below the upper surface of the body of water, from water movement relative to the deposition unit, from wave movement or movement at the upper surface of the body of water, from temperature gradients between upper and lower levels in the water body, from solar radiation, and from wind or air movement above the water body surface. It is expected that the proximate natural sources of energy will be those available in the immediate vicinity of the water body, probably directly above the deposition unit or surrounding the apparatus illustrated.

Figure 5:
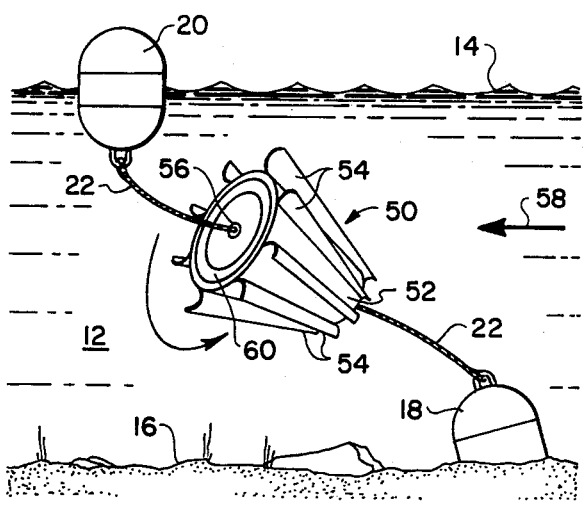
FIG. 5 illustrates an embodiment of the invention similar to FIG. 1, wherein the electrodeposition unit also includes means for generating an electrical current from the flow of moving water relative to the deposition unit.

Apparatus 50 illustrated in FIG. 5 is one example of means positioned below the upper surface 14 of the water body 12 for generating an electrical current from energy received from the flow of water. The apparatus 50 is attached to the tether cord 22 intermediate the anchor 18 and buoy 20, or could be made self-buoyant and attached by the cord only to the anchor 18. The apparatus 50 includes an outer truncated conically-shaped enclosure 52 having a plurality of curved fins 54 extending radially outward from the housing 52. The housing 52 is mounted for rotation with respect to a center member 56. The center member 56 is firmly secured to the tether cord 22. Within the interior of the apparatus 50 defined between the housing 52 and center member 56 is a conventional direct current electrical generator (not shown). The stator of the electrical generator is fixed to the center member 56, and the rotor of the generator is connected with the housing 52 whereby the rotor is rotated with respect to the stator when the housing 52 rotates with respect to the center member 56. Relative rotation of the stator and rotor causes the electrical generator to deliver a source of direct current and voltage. Rotation of the housing 52 with respect to the center member occurs when the tidal flow or other water movement, schematically illustrated at 58, applies force on the fins 54 to cause rotation of the housing 52. Thus, electrical energy is generated from the energy associated with the natural flow of water relative to the apparatus 50.

The apparatus 50 also advantageously incorporates the anode and cathode surfaces of the deposition unit. Stated differently, the apparatus 50 may serve both as a means for generating electricity from moving water flow and as the deposition unit. The anode and cathode surfaces are provided by electrode conductors fixed on the outer housing 52. One such electrode conductor is illustrated at 60. Upon rotation of the housing 52 with respect to the center member 56, the electrical generator supplies direct current to the anode and cathode surfaces, one of which being illustrated at 60, to effect electrodeposition. The flow of water past the apparatus 50 insures that a replenished supply of minerals and other materials is always available for electrodeposition, as well as operatively creating the electrical current flow between the anode and cathode surfaces. Of course, apparatus 50 employing the only electrical generating apparatus could be electrically connected by conductors 46 and 48 to a separate deposition unit such as that shown in FIG. 4.

Figure 6:
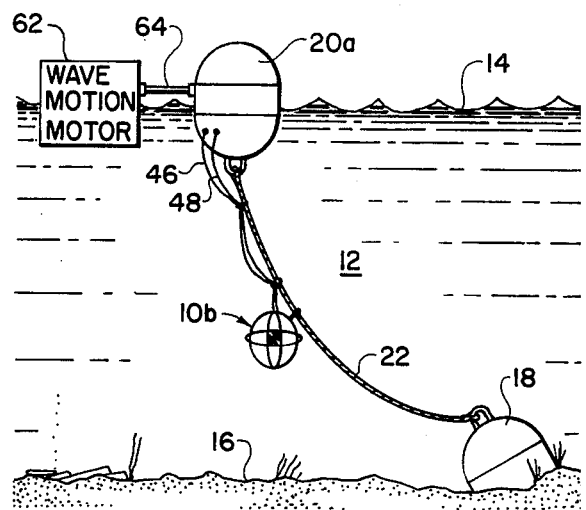
FIG. 6 illustrates another embodiment of the invention similar to FIGS. 1 and 5, wherein electrical energy for electrodeposition is derived from energy associated with waves on the upper surface of the water body.

Apparatus 62 for obtaining energy from the waves at the surface of the water body is illustrated schematically in FIG. 6. A modified buoy 20a positions the apparatus 62 at the surface 14 of the water body 12. The apparatus 62 is a motor which receives energy from wave motion. Examples of wave motion motors are disclosed in U.S. Pat. Nos. 1,078,323 and 1,295,170, and other wave motion motors are known in the art. Means schematically shown as a shaft 64 mechanically connects and supplies mechanical movement from the wave motion motor to an electrical generator (not shown) positioned internally within the buoy 20a. The mass of the buoy 20a and its partially restricted connection through the tether cord 22 to the anchor 18 create a certain resistance to movement under the influence of waves which allows the wave motion motor to derive energy from wave movement relative to the buoy. The electrical generator utilizes the movement derived from the passing wave energy to generate the direct source of voltage and current and to supply the electrical energy to the conductors 46 and 48. The electrical connectors extend around the tether cord 22 to the deposition unit 10b. Thus, naturally occurring energy derived from wave energy is utilized in supplying electrical energy for electrodeposition at the deposition unit.

Figure 7:
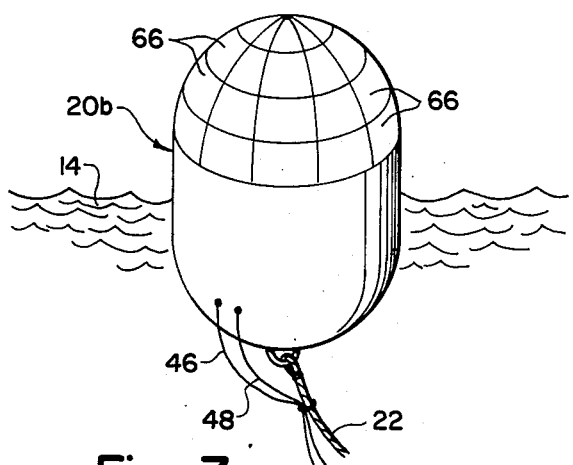
FIG. 7 is a diagramatic illustration of a buoy incorporating a plurality of photovoltaic cells for generating electrical current in response to receipt of natural solar radiation, which illustrates another feature of the invention.

The buoy 20b shown in FIG. 7 illustrates another means for deriving energy from a naturally occurring energy source sufficient for effecting electrodeposition at the deposition unit. The buoy 20b comprises a plurality of conventional photovoltaic cells 66 positioned in the upper portion of the buoy above the upper surface 14 of the water body. The cells 66 are directly exposed to solar radiation. A transparent water-tight enclosure (not shown) covers the cells 66 and prevents water from contacting them but allows incident solar radiation to impinge on the cells. As is known, the photovoltaic cells 66 directly generate electrical energy from solar radiation. The plurality of cells 66 can then be appropriately electrically connected together and to the conductors 46 and 48 for supplying the direct source of current and voltage to the deposition unit.

Figure 8:
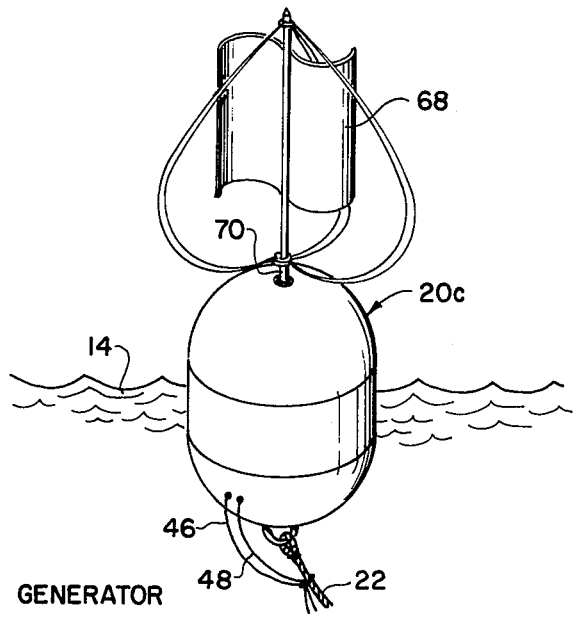
FIG. 8 is a diagramatic illustration of another form of a buoy incorporating wind powered electrical generation means for generating electrical current upon the passage of wind past the buoy, which illustrates another feature of the invention.

FIG. 8 illustrates a buoy 20c including elements for the purpose of obtaining energy from naturally occurring wind proximately above the surface 14 of the water body. Extending vertically of the upper surface of the buoy 20c is a wind wheel 68. The wind wheel 68 is of the recognized Savonius/ $\phi$—Darrieus type, having blade elements which are rotated by the wind. The rotating blade elements rotate a main shaft 70 of the wheel 68, and the main shaft 70 is mechanically connected to an electrical generator (not shown). Rotation of the wheel 68 drives the electrical generator and creates a direct source of current and voltage on the conductors 46 and 48. The generated electrical energy creates electrodeposition at the deposition unit. A variety of different wind wheels or motors could be employed. Examples of wind wheels and motors are disclosed in "Wind Machines", National Science Foundation, October, 1975, p. 18.

Figure 9:
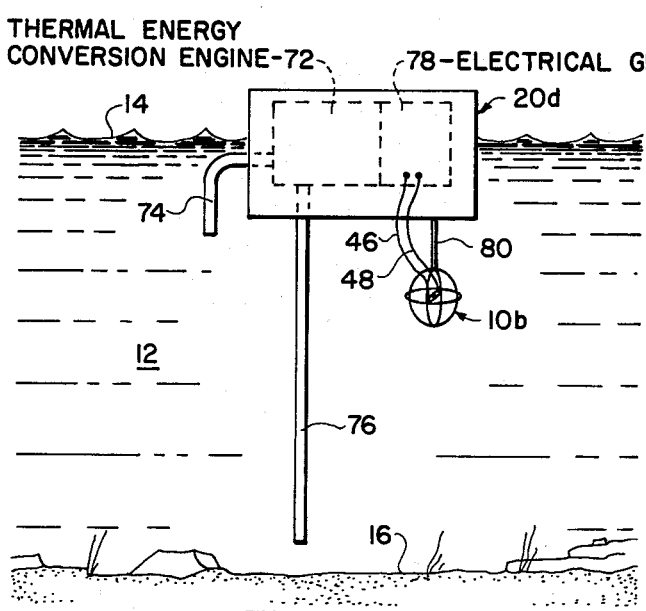
FIG. 9 is a general schematic view illustrating another embodiment of the invention, and also illustrating means for generating electrical energy from that energy available from a thermal temperature gradient in the water body.

FIG. 9 illustrates among other things, apparatus for obtaining naturally occurring energy resulting from temperature or thermal gradients between the upper and lower levels in the body of water 12. A modified buoy 20d contains within its interior a water body thermal energy conversion engine 72. Connected to the engine 72 are conduits 74 and 76 extending into the water body 12 at different depths. It is recognized that solar energy is collected and stored as heat in the thin upper surface layers of water, and that the lower surface levels may be significantly cooler than the upper surface levels. Energy resulting from this temperature gradient is derived by the engine 72, and the engine 72 operates on a recognized thermodynamic cycle utilizing energy derived from the cooler water admitted from the lower depths of the water body 12 through conduit 76 as compared to the warmer water obtained at the upper water levels. Energy received from the thermal temperature gradient of the water body is converted into mechanical form, typically by a turbine, and is utilized to drive an electrical generator 78. The electrical generator supplies a direct source of current and voltage to the deposition unit 10b. In this case, the deposition unit 10b has been suspended in the water body by a support 80 intermediate the upper surface 14 and floor bed 16 of the body of water. The inertia of the buoy 20d positions the deposition unit 10b to allow a flow of water relative to the deposition unit. Thus, the energy available from the naturally occurring temperature gradient in the water body proximate the deposition unit is utilized to derive energy for effecting electrodeposition. A discussion of the technology involved in water body thermal energy conversion engines, and references to exemplary disclosure of such engines is presented in "Ocean Resources Utilization", American Society of Mechanical Engineers, pp. 96–104, 1976.

The invention thus incorporates a variety of different arrangements for securing energy from naturally occurring and proximate energy sources sufficient to create electrodeposition at the deposition unit. Consequently, relatively expensive external sources of power are not required to achieve effective electrodeposition results. The amount of electrical energy created from the naturally occurring energy sources is relatively small, but even the relatively small amount of electrical energy significantly enhances the rate of deposition. The concentrations of the sought after minerals is so low that the use of more power is not particularly effective in obtaining deposition more quickly. Over time, worthwhile deposits of metals, minerals and other materials are carried to the cathode surface of the deposition unit and collected there. Since the deposition units can be positioned in the natural body of water virtually indefinitely due to the continual supply of proximate natural energy obtained, it is not particularly critical that the electrical energy supplied be of a certain magnitude.

The results of two qualitative experiments employing the concepts of the present invention are useful in understanding the advantages obtained. In the first experiment, a horseshoe-shaped permanent magnet having strength of 3,000 gauss was employed. A selenium coated aluminum plate was positioned across both polar ends of the magnet. A silastic encapsulating material was molded over the magnet and coated aluminum plate, with the exception that the cathode surface of the aluminum plate was freely exposed to the moving water body. In the second experiment, an oval-shaped pure copper wire anode electrode and a cylindrically-shaped pure copper foil cathode electrode were positioned at the deposition unit. A 1.4 volt source of direct voltage was connected between the anode and cathode electrodes. Silastic encapsulating material was molded over the voltage source. In both experiments, the deposition unit was positioned as is generally illustrated in FIG. 1. The deposition unit was placed in the ocean tide off Southern California for a period of 24 hours. At the end of the test period, the cathode surfaces were rinsed with nitric acid to remove the materials deposited. Chemical analysis of the deposition materials showed the following results:

| Elemental Metal | Experiment I | Experiment II |
|---|---|---|
| Cobalt | .10 MG/L | .22 MG/L |
| Copper | 1.68 MG/L | Not available |
| Nickel | 38.0 MG/L | .1 MG/L |
| Zinc | 3.95 MG/L | 4.34 MG/L |
| Manganese | .12 MG/L | .08 MG/L |
| Magnesium | 3.2 MG/L | 530 MG/L |

The results from the second experiment on copper are not available because the electrode surfaces in this experiment were made from copper, and no attempt was made to determine how much copper was deposited as compared to that removed from the copper electrode by the acid rinse. The nickel results from the first experiment or the magnesium results from the second experiment may not be reliable due to a possible failure in the silastic coating over the magnet which contained some nickel or over the voltage source. Otherwise, any concentration over 0.05 MG/L is judged to be the result of the present invention.

It can therefore be seen that the present invention teaches concepts by which mining minerals and other materials from natural bodies of water becomes economically feasible. Although relatively small deposits of the minerals and other materials can be obtained, a large number of deposition units can be employed. The mining or deposition occurs as a result of naturally occurring proximate energy sources. No significant detrimental effects to the environment occur because of the preferable use of natural environmental effects in practicing the invention. Other than the expense of initially securing the necessary apparatus to practice the invention and to occasionally remove the deposition units from the water and collect the deposits therefrom, very little expense is involved in the mining operation. The subsequent refining treatment is particularly economical and conservative of energy. It is therefore apparent that the present invention is of considerable importance in the field of mining minerals and other deposits from naturally occurring water bodies.

The concepts and features of the present invention have been described with the degree of particularity presently possible. It should be understood, however, that the specificity of the present disclosure has been made by way of example, and that changes in details of features may be made or become necessary without departing from the spirit of the invention.

I claim as my invention:

1. A method of mining dissolved or suspended materials including metallic ions and compounds of metals carried by and contained within a natural body of naturally moving water, such as ocean water or the like, comprising:

suspending a deposition unit in a natural body of naturally moving water in a condition in which the moving water establishes a flow of water and said materials relative to and substantially encompassing the deposition unit, said deposition unit comprising a cathode surface which is exposed substantially only to the natural flow of water and said materials, and means operatively associated with the cathode surface for establishing a flow of electrical current through the water at the cathode surface;

establishing a flow of electrical current in the water at the cathode surface to electrolytically deposit materials from the water on the cathode surface; and deriving energy for creating the flow of electrical current from a natural energy source occurring at the body of water.

2. A method of mining dissolved or suspended materials including metallic ions and compounds of metals carried by and contained within a natural body of naturally moving water such as ocean water or the like, comprising:

submerging a deposition unit in a natural body of naturally moving water;

restricting movement of the deposition unit relative to the movement of water to establish a flow of water and said materials relative to the deposition unit, thereby supplying an undepleted supply of materials contained within the moving water to the deposition unit;

providing a cathode surface positioned on said deposition unit for exposure with the flow of water and materials;

positioning the deposition unit for substantially free exposure of the cathode surface only to the natural flow of water and materials, establishing a flow of electrical current at the cathode surface through the water, thereby causing electrodeposition of at least some materials on the cathode surface; and deriving energy for creating the flow of electrical current from a naturally occurring energy source at the body of water.

3. A method as recited in claim 1 or 2 wherein deriving the energy for creating the electrical current comprises:

utilizing energy obtained at least in part from moving water to operatively estabish the electrical current.

4. A method as recited in claim 3 wherein utilizing energy obtained from moving water further comprises:

receiving energy created by natural movement of water beneath the upper surface of the body of water, and utilizing the energy received from the moving water at least in part for generating the electrical current at the cathode surface.

5. A method as recited in claim 3 wherein utilizing energy obtained from moving water further comprises:

receiving energy created by natural movement of water at the upper surface of the body of water, and utilizing the energy received from the moving water at the upper surface at least in part for generating the electrical current at the cathode surface.

6. A method as recited in claims 1 or 2 wherein deriving the energy for creating the electrical current comprises:

utilizing natural energy contained within the natural body of water to operatively establish the electrical current.

7. A method as recited in claim 6 wherein the natural energy utilized is that energy available from a temperature difference between different areas of the water body.

8. A method as recited in claims 1 or 2 wherein deriving energy for creating the current comprises:

receiving energy created by natural movement of the air above and over at least a portion of the upper surface of the body of water above the deposition unit, and utilizing the energy received from air movement for generating the electrical current at the cathode surface.

9. A method as recited in claims 1 or 2 wherein deriving energy for creating the current comprises:

receiving natural solar energy on a portion of the upper surface of the body of water above the deposition unit, and utilizing energy created by the solar energy received for generating the electrical current at the cathode surface.

10. A method as recited in claims 1 or 2 further comprising:

removing the deposition unit from the body of water after a preselected amount of material has been deposited on the cathode surface of said deposition unit, and removing at least a part of the preselected amount of material deposited on the cathode surface of said deposition unit.

11. A method as recited in claim 3 wherein utilizing energy obtained from moving water further comprises:

creating magnetic flux in the flow of water at the cathode surface of said deposition unit, whereby the flow of water and the materials carried by the water through the magnetic flux create the electrical current.

12. A method as recited in claim 11 wherein the magnetic flux is created by a permanent magnet connected with said deposition unit.

13. A method as recited in claim 11 further comprising:

rectifying the electrical current flow through the water at the cathode surface.

14. A method of mining dissolved or suspended charged materials including metallic ions and compounds of metals or the like carried by and contained within a flow of fluid, comprising:

positioning a deposition surface means within the flow of fluid and materials, and producing magnetic flux in the flow of fluid and materials of sufficient intensity for creating an electrical current. flow involving the charged materials at the deposition surface means to electrolytically deposit at least some of said materials at the deposition surface means.

15. Apparatus for use in mining dissolved or suspended materials including metallic materials, ions and compounds of metals carried by and contained within a natural body of naturally moving water, such as ocean water or the like, comprising in combination:

a deposition unit operatively submerged below the upper surface of the body of water, said deposition unit comprising a cathode surface positioned for substantially free exposure only to the natural movement of water and said materials relative to the deposition unit;

generating means operatively electrically connected with the cathode surface of said deposition unit for creating electrical energy from a naturally occurring energy source and for conducting the electrical energy created to the cathode surface of said deposition unit, whereby the electrical energy establishes an electrical current at the cathode surface and causes electrodeposition of at least some material carried by the moving water at the cathode surface of said deposition unit, and positioning means connected for positioning said deposition unit below the upper surface and above the lower surface of the water body and in substantially freely exposed condition to the flow of water and materials within the water body and for positioning said generating means at the water body and proximate said deposition unit to receive natural energy sources available at the water body.

16. Apparatus as recited in claim 15 wherein said positioning means comprises:

anchor means positioned substantially below the upper surface of a natural body of water;

buoy means for floating adjacent the upper surface of the body of water and substantially above said anchor means; and connection means extending substantially directly between said anchor means and said buoy means.

17. A deposition unit for use in mining dissolved or suspended materials including metallic ions and compounds of metals and the like carried by and contained within a natural body of moving water, such as ocean water or the like, comprising:

means for suspending said deposition unit below the upper surface and above the lower surface of the water body and in substantially freely exposed condition to the flow of water and materials within the water body;

deposition surface means positioned on said deposition unit for substantially free exposure only to the natural movement of water and said materials relative to the deposition unit; and means for producing magnetic flux extending into the water body at said deposition surface means.

18. A deposition unit as recited in claim 17 wherein said means for producing magnetic flux comprises magnet means.

19. A deposition unit as recited in claim 18 wherein said magnet means comprises a permanent magnet.

* * * * *